United States Patent

Buskens et al.

Patent Number: 5,943,334
Date of Patent: Aug. 24, 1999

[54] METHOD OF USING AN INTELLIGENT MOBILE TERMINAL FOR RECONNECTING CALLS IN A WIRELESS TELECOMMUNICATIONS SYSTEM

[75] Inventors: Richard Wayne Buskens, Middletown, N.J.; Thomas F. La Porta, Thornwood, N.Y.; Arun Narayan Netravali; Krishan Kumar Sabnani, both of Westfield, N.J.

[73] Assignee: Lucent Technologies Inc., Murray Hill, N.J.

[21] Appl. No.: 08/771,739

[22] Filed: Dec. 20, 1996

[51] Int. Cl.$^6$ .............................. H04Q 7/00; H04Q 7/22; H04J 3/06; H04B 1/00

[52] U.S. Cl. ..................... 370/350; 370/328; 455/450; 455/455; 455/502

[58] Field of Search ..................................... 370/328, 329, 370/310, 350; 455/62, 442, 445, 450, 455, 502

[56] References Cited

U.S. PATENT DOCUMENTS 5,212,808  5/1993  Su et al. .................................. 455/502
5,544,224  8/1996  Jonsson et al. .......................... 455/434
5,566,225  10/1996  Haas ......................................... 455/445

OTHER PUBLICATIONS

T. S. Rappaport, Wireless Communications, pp. 494 and 496, Jan. 1996.

*Primary Examiner*—Michael Horabik
*Assistant Examiner*—Kevin C. Harper
*Attorney, Agent, or Firm*—Mony R. Ghose

[57] ABSTRACT

An intelligent mobile terminal includes a reconnection processor for reestablishing calls affected by a loss of synchronization of signals between the mobile terminal and a serving base station. In the preferred embodiment, the serving base station establishes a reconnection channel for issuing messages relating to new air traffic channels. The reconnection processor causes a mobile terminal to tune to the reconnection channel in the event of loss of synchronization. Information received over the reconnection channel is used by the mobile terminal to reestablish calls affected by loss of synchronization.

10 Claims, 5 Drawing Sheets

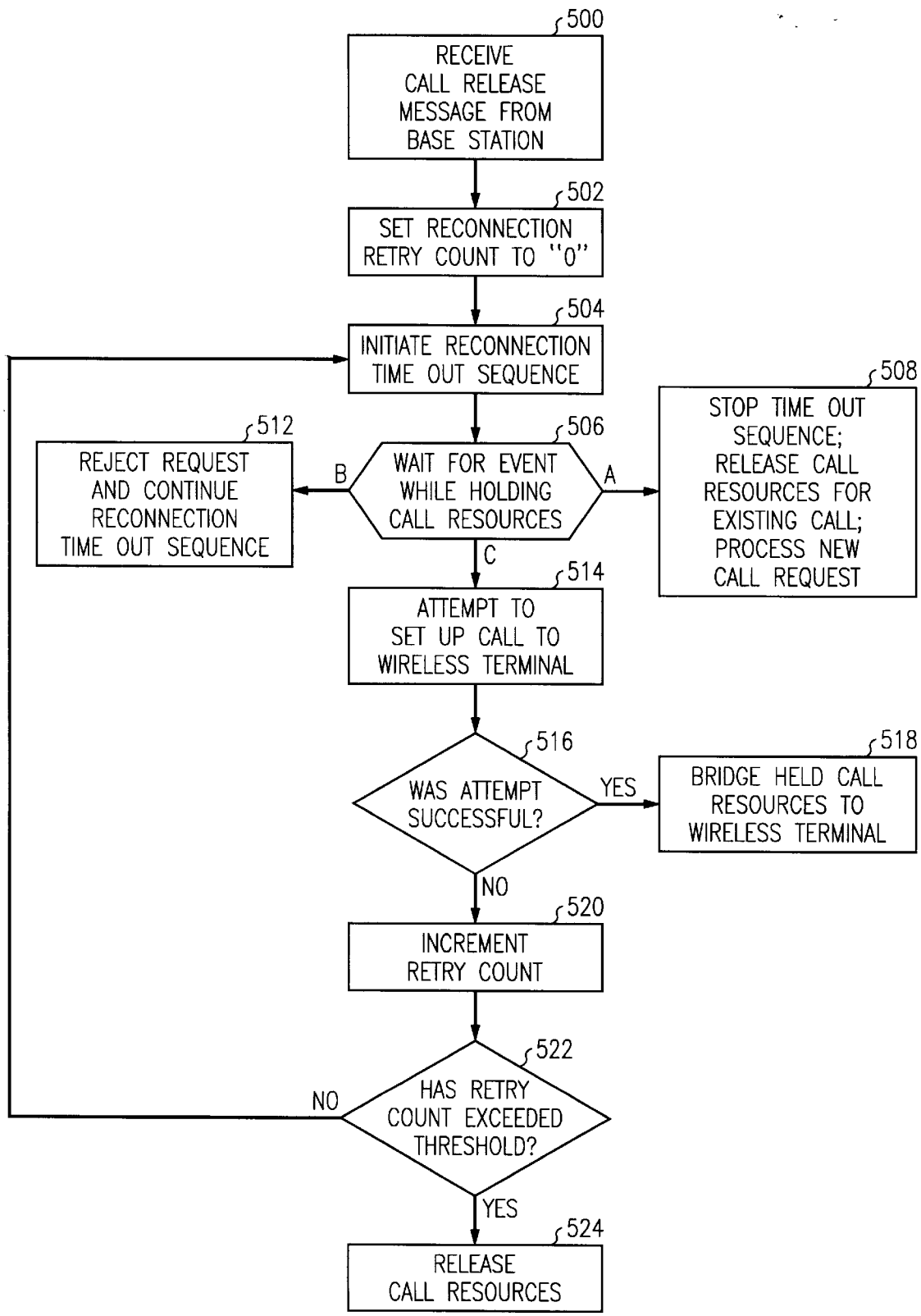

METHOD OF USING AN INTELLIGENT MOBILE TERMINAL FOR RECONNECTING CALLS IN A WIRELESS TELECOMMUNICATIONS SYSTEM

CROSS-REFERENCE TO RELATED APPLICATION

This application is related to the application of Richard W. Buskens, Thomas F. LaPorta, Arun N. Netravali, and Krishnan K. Sabnani entitled "Method For Reconnecting Calls In A Wireless Telecommunications System" which U.S. Ser. No. 08/771,740, application is assigned to the assignee of the present invention and is being filed concurrently herewith.

TECHNICAL FIELD

This invention relates to wireless telecommunications, and more particularly, to efficiently reconnecting calls in wireless telecommunications systems.

BACKGROUND OF THE INVENTION

The hallmark of wireless telecommunications services is mobility gained by the elimination of wired connections. Indeed, the ability to use a mobile terminal (such as a cellular telephone) to originate and receive calls across a wide range of geographic locations is enabled by the use of an allocated portion of radio spectrum dedicated to transmitting voice, data, and control information. More particularly, mobile terminals send and receive voice, data, and control information from base stations over an air interface. The base station serves as a gateway point between the mobile terminal and a mobile switching center. The mobile switching center provides call processing services and resource allocation for establishing call connections in the wired network which is required for connecting mobile terminals to other parties.

To establish a call, a base station allocates air traffic channels to a mobile terminal for transmitting voice, data, and control information. In one implementation, a traffic channel operates at a carrier frequency comprising time slots during which the mobile terminal transmits data frames (including synchronization bits) to the base station and vice versa. One problem with mobile telecommunications is that synchronization needed to maintain a connection between a mobile terminal and base station is often lost. The most common cause for loss of synchronization is the inability of the terminal or base station to detect the carrier frequency of the traffic channels used in the call. Another cause of loss of synchronization is the inability to receive data frames from the mobile to the base station (or vice versa) in their anticipated time slots due to obstructions such as trees, buildings, tunnels or noise interference. In current implementations, both the serving base station and the mobile terminal wait for each others carrier frequencies (or data stream) to be reinstated for a specified period (a resynchronization "time-out" period) before the loss of synchronization precipitates call release procedures tearing down the existing call in the base station. From the base station perspective, releasing a call results in releasing the air traffic channels and other resources associated with the call. If the base station fails to resynchronize, it sends a call release message indicating disconnect to the mobile switching center so that call connections to the other party (or parties) are released. In the current art, from the mobile terminal perspective, releasing a call involves termination of data traffic on the air traffic channel allocated to the call, and resetting an internal state of the terminal so that new calls can proceed.

Abnormally released calls due to loss of synchronization result in subscriber frustration and a need for reestablishing the call. Reestablishing a call requires re-dialing and reestablishing connections interconnecting the mobile terminal to its parties. Hence, reconnecting disconnected calls not only requires subscriber action but also requires duplicated network action. Therefore, there is a need in the art for efficiently reconnecting mobile calls to decrease subscriber inconvenience and enhance network efficiency when disconnected calls are reconnected.

SUMMARY OF THE INVENTION

This need is addressed and a technological advance is achieved in the wireless telecommunications art by an intelligent mobile terminal which actively attempts call reconnection in the event of loss of synchronization. For purposes of the present invention, call disconnect is defined as the point at which loss of synchronization would ordinarily cause a call to be released.

In the preferred embodiment, a mobile terminal includes a reconnection processor used for interaction with a base station over a reconnection channel. Upon detection of call disconnect, the reconnection processor tunes to a reconnection channel established by a base station. The mobile terminal and base station use a reconnection protocol to exchange information regarding reconnection. For example, information transmitted over the reconnection channel may be used by the mobile terminal for tuning to new air traffic channels so that the call may be continued. Alternatively, the mobile terminal may request new air traffic channels by transmitting signals over the reconnection channel.

Advantageously, the intelligent mobile terminal recognizes loss of synchronization and takes action to reestablish the affected call resulting in fewer disconnected calls.

BRIEF DESCRIPTION OF THE DRAWINGS

FIG. 5 is a flow diagram illustrating the steps performed by a mobile switching center in the wireless telecommunications system of FIG. 1 in accordance with the preferred embodiments of the present invention.

DETAILED DESCRIPTION

Figure 1:
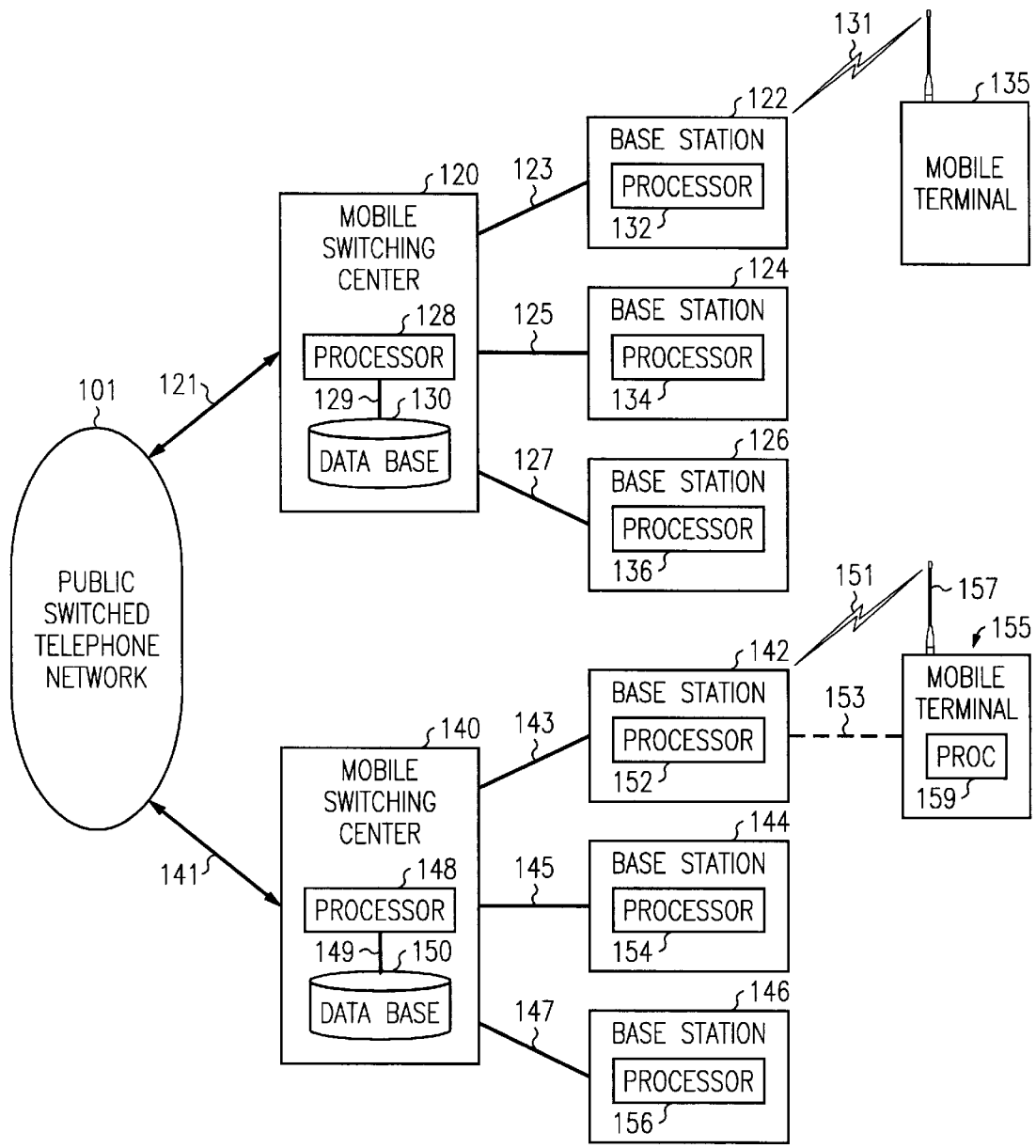
FIG. 1 is a simplified block diagram of a preferred embodiment of a wireless telecommunications system.

FIG. 1 shows a simplified block diagram of wireless telecommunications system 100 including mobile switching center 120 and mobile switching center 140 interconnected to the rest of the public switched telephone network 101 via established trunks 121 and 141, respectively. Mobile switching center 120 includes processor 128 interconnected to database 130 via data link 129. Processor 128 includes a timing means and is responsible for performing call processing functions (such as set up and tear down of calls) and retrieving information such as routing information used to set up a call from database 130. In this embodiment, mobile switching center 120 serves base stations 122, 124 and 126 via established base station links 123, 125 and 127 respectively. In the preferred embodiment, each base station includes a processor (with embedded memory and timing means) for administering call reconnection protocols as described below. Base stations 122, 124 and 126 include processors 132, 134 and 136, respectively. In this example, mobile terminal 135 is served by base station 122. Established air interface connection 131 indicates that mobile terminal 135 is active in a call.

Mobile switching center 140 includes processor 148 interconnected to database 150 via data link 149. Processor 148 includes a timing means and is responsible for performing call processing functions (such as set up and tear down of calls) and retrieving information such as routing information used to set up a call from database 150. In this example, mobile switching center 140 serves base stations 142, 144 and 146 via base station links 143, 145 and 147, respectively. Similar to mobile switching center 120, each base station includes a processor with embedded memory and timing means for administering reconnection protocols, as described below. In this example, base stations 142, 144 and 146 include processors 152, 154 and 156, respectively. Mobile terminal 155, served by base station 142, is interconnected to the base station via air interface connection 151. In the preferred embodiment, mobile terminal 155 includes antenna 157 and reconnection processor 159 for responding to a base station using a reconnection protocol. The reconnection protocol is administered by the base station over an established reconnection channel. In this embodiment, base station 142 has dedicated reconnection channel 153 for operating the reconnection protocol.

Calls involving mobile terminals 135 and 155 are established using known procedures which allow voice and data transmissions to be relayed from a base station to a mobile terminal and vice versa. Occasionally, the air interface between the base station and the mobile terminal is obstructed resulting in a loss of synchronization and call release if resynchronization cannot be achieved. In accordance with the preferred embodiment, an active attempt to reconnect the portion of the connection affected by loss of synchronization calls is made before network call release procedures are invoked.

Figure 2:
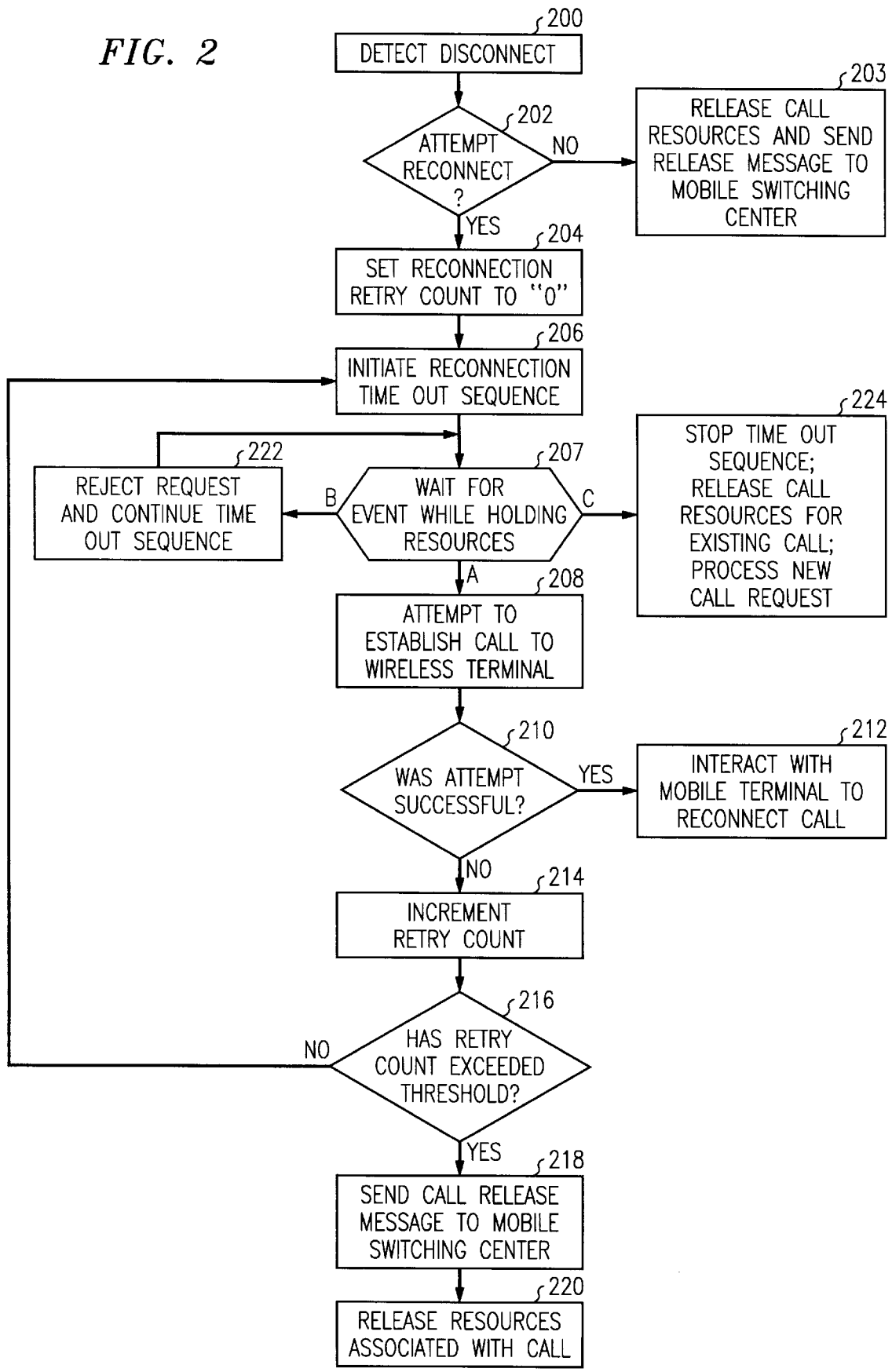
FIG. 2 is a flow diagram illustrating the steps performed by a base station shown in the wireless telecommunications system of FIG. 1 in accordance with the preferred embodiment of the present invention.

FIG. 2 illustrates the steps performed by a base station to reconnect a call in accordance with one preferred embodiment of the present invention. More particularly, FIG. 2 illustrates the steps performed by base station 122 (that is, a base station without a dedicated reconnection channel) in reestablishing a call.

For purposes of example, assume that a subscriber using mobile terminal 135 is involved in a call with a party served by public switched telephone network 101. Accordingly, air traffic channel 131 is established to transmit voice between mobile terminal 135 and the customer premises equipment of the other party (not shown) via base station 122, mobile switching center 120 and trunk 121. Also assume that the data flow between mobile terminal 135 and base station 122 is interrupted due to loss of synchronization. The reconnection process begins in step 200 in which base station 122 detects disconnect of the call (that is, the loss of synchronization is detected and the resynchronization time-out sequence has expired without successfully resynchronizing to the mobile terminal). The base station recognizes the disconnect to be involuntary (as opposed to a user simply ending a call by hanging up) because no formal call release message is received.

In decision step 202, base station 122 determines whether reconnection procedures should be attempted. More particularly, decision step 202 allows base station 122 to selectively deploy the reconnection process. In some circumstances, such as an unusually heavy call volume, base station 122 may be programmed to immediately release call resources upon detection of a disconnect. If the outcome of decision step 202 is a "NO" determination, the process continues to step 203 in which base station 122 initiates call release procedures and sends a call release message indicating disconnect to mobile switching center 120. If the outcome of decision step is a "YES" determination, the process continues to step 204 in which base station 122 sets a reconnection retry count to "zero". In step 206, the base station begins a reconnection time-out sequence during which the base station attempts to establish new air traffic channels to be used between base station 122 and mobile terminal 135. In step 207, base station 122 waits for an event to occur while holding call resources associated with the interrupted call. Each of the possible events is discussed in detail below.

The process continues through connector A when the reconnection time-out sequence has expired. In step 208, base station 122 makes an attempt to reestablish the portion of the connection affected by the loss of synchronization. In decision step 210, base station 122 determines whether the reconnection attempt was successful. If the outcome of decision step 210 is a "YES" determination, the process continues to step 212 in which base station 122 uses new air interface resources (i.e., traffic channels) in the call with the mobile terminal. If the outcome of decision step 210 is a "NO" determination, the process continues to step 214 in which the reconnection retry count is incremented. The process continues to step 216 in which base station 122 determines whether the reconnection retry count has been incremented beyond a predetermined threshold. If the outcome of decision step 216 is a "NO" determination, the process returns to step 206 in which the reconnection time-out sequence is initiated. If the outcome of decision step 216 is a "YES" determination, the process continues to step 218 in which base station 122 sends a call release message indicating disconnection to the mobile switching center. In step 220, the base station releases all call resources associated with the disconnected call.

The process continues through connector B when another incoming call directed to mobile terminal 135 has been received during the time-out sequence. The process continues to step 222 in which the incoming call request is rejected and the time-out sequence is continued. In alternative embodiments, the incoming call request may be honored. In these embodiments, the time-out sequence is halted, call resources associated with the disconnected call are released, and the incoming call is processed as a new call request.

The process continues through connector C when the subscriber using mobile terminal 135 attempts to originate a call during the time-out sequence. The process continues to step 224 in which the time-out sequence is terminated, call resources for the existing call are released and the new call request is processed.

Figure 3:
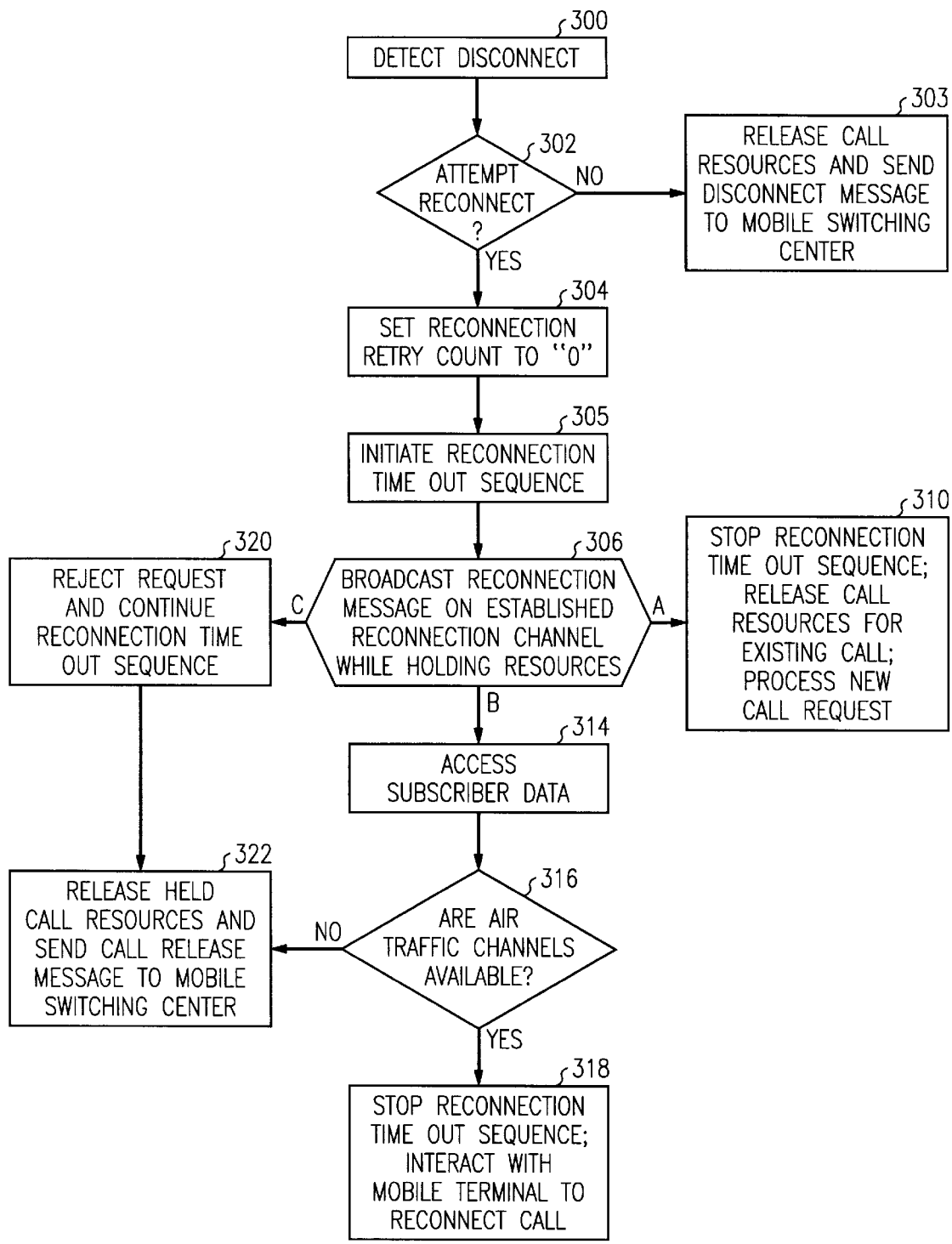
FIG. 3 is a flow diagram illustrating the steps performed by a base station shown in the wireless telecommunications system of FIG. 1 in another preferred embodiment of the present invention.

FIG. 3 is a flow diagram illustrating the steps performed during another preferred embodiment of the present invention. More particularly, FIG. 3 describes the steps performed by base station 142 which includes reconnection channel 153 for relaying messages to a mobile terminal. For the reconnection channel to be functional, the mobile terminal involved in the call must be equipped with a reconnection processor. For purposes of explanation, assume that a subscriber is involved in a call using mobile terminal 155 (that is, a mobile terminal including a reconnection processor) when a loss of synchronization occurs and a resynchronization timer expires. The process begins in step 300 in which base station 142 detects call disconnect.

The process continues to decision step 302 in which base station 142 determines whether reconnection procedures should be attempted for this particular call. If the outcome of decision step 302 is a "NO" determination, the air traffic channel interconnecting base station 142 to mobile terminal 155 is released and a call release message indicating the disconnect is sent to the mobile switching center in step 303. If the outcome of decision step 302 is a "YES" determination, the process continues to step 304 in which base station 142 sets a reconnection retry count to "zero". In step 305, the base station initiates a reconnection time-out sequence. In step 306, base station 142 broadcasts a reconnection message to mobile terminal 155 over reconnection channel 153 while holding all resources associated with the call. Although reconnection channel 153 is shown to exclusively serve terminal 155, other embodiments may use a global channel to serve all mobile terminals. In the preferred embodiment, the reconnection message instructs the mobile terminal to tune to new air traffic channels so that the call may be reconnected. In other embodiments, base station 142 sends a message over the reconnection channel informing mobile terminals to request new resources.

During the broadcast, a variety of events may occur. First, the subscriber associated with mobile terminal 155 may elect to originate a call. If this event occurs, the process continues through connector A to step 310 in which the time-out sequence is halted, a call a release message is sent to the mobile switching center and the new call request is processed. If the subscriber calls the disconnected party, resources may be bridged without tearing down the existing call. Secondly, the mobile subscriber associated with mobile terminal 155 may also explicitly elect to reconnect the call. This election is signaled by the wireless subscriber sending a message to the serving base station (e.g., the subscriber may depress key pad buttons *56 to indicate that reconnection is desired) over the reconnection channel. If the subscriber requests reconnection, the process continues through connector B to step 314 in which base station 142 accesses its database to retrieve subscriber information relating to mobile terminal 155. The process continues to decision step 316 in which base station 142 determines whether there are any air traffic channels available to reconnect the previously disconnected call. If the outcome of decision step 316 is a "YES" determination, the process continues to step 318 in which the base station stops the reconnection time-out sequence and bridges the held call resources with those connecting the base station to the mobile terminal. If the outcome of decision step 316 is a "NO" determination, the process continues to step 322 and all call resources associated with the call are released. Also, a call release message indicating disconnect is sent to the mobile switching center.

Another event which may occur during the time-out sequence is that a new incoming call may be directed to mobile terminal 155. In this case, the process continues through connector C to step 320 in which the incoming call request is rejected and the time-out sequence is continued until the time-out expires. If the time-out sequence expires, the processor continues to step 322 in which base station 142 sends a call disconnect message to the mobile switching center so that all call resources may be released.

Figure 4:
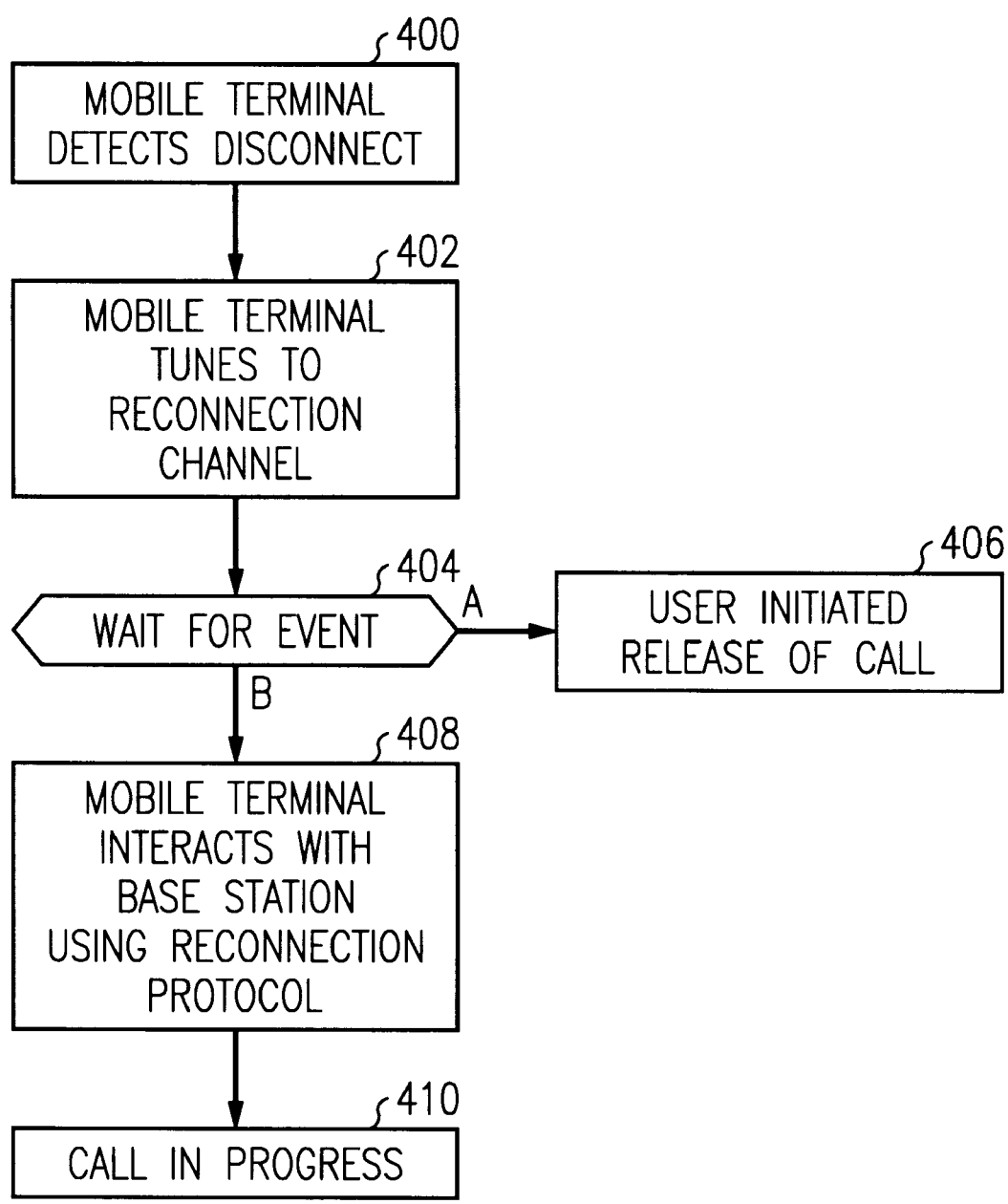
FIG. 4 is a flow diagram illustrating the steps performed by a mobile terminal in the wireless telecommunications system of FIG. 1 in accordance with the preferred embodiment of the present invention.

FIG. 4 is a flow diagram illustrating the steps performed by a mobile terminal during a reconnection attempt. For purposes of clarity, continue with the example of mobile terminal 155 involved in a call when a loss of synchronization and expiration of a resynchronization timer occurs. In this example, base station 142 serving mobile terminal 155 has established reconnection channel 153 for administering a reconnection protocol. Reconnection processor 159 contained within mobile terminal 155 allows the terminal to interact with base station 142 over reconnection channel 153. The process begins in step 400 in which mobile terminal detects call disconnect.

The process continues to step 402 in which reconnection processor 159 tunes to reconnection channel 153 using antenna 157. In step 404, mobile terminal 155 waits for an event. If the process continues through connector A to step 406, the user of mobile terminal 155 releases its resources associated with the call. If a reconnection message is received, the process continues through connector B to step 408. In step 408, mobile terminal 155 interacts with the base station using the reconnection protocol. In the preferred embodiment, the reconnection protocol involves transmitting information (either initiated by the mobile terminal or by the base station) for reestablishing the air interface portion of the call. The process continues to step 410 in which the call is in progress.

FIG. 5 illustrates the steps performed by a mobile switching center equipped with call reconnection capabilities. The process begins in step 500 in which the mobile switching center receives a call release message indicating disconnect from a base station. In step 502, the mobile switching center sets a reconnection retry count to "zero". In step 504, a reconnection time-out sequence is initiated during which all call resources are held. In step 506, the mobile switching center waits for an event to occur. If a subscriber using mobile terminal 155 attempts to place a call during the time-out sequence, the process continues through connector A to step 508 in which the time-out sequence is terminated, call resources for the existing call are released, and the new call request is processed. If an incoming call request is directed to mobile terminal 155, the process continues through connector B to step 512 in which the incoming call request is rejected and the time-out sequence is continued. In alternative embodiments, however, the incoming call request may be honored. If the time-out sequence expires, the process continues through connector C to step 514 in which the mobile switching center attempts to set up an incoming call to the mobile subscriber associated with mobile terminal 155 via base station 140. In decision step 516, the mobile switching center determines whether the incoming call setup request was successful. If the outcome of decision step 516 is a "YES" determnination, the process continues to step 518 in which held call resources are bridged to the new call setup to the mobile terminal. If the outcome of decision step 516 is a "NO" determination, the process continues to step 520 in which the reconnection retry count is incremented. In decision step 522, the mobile switching center determines whether the reconnection retry count has been incremented beyond a predetermined threshold. If the outcome of decision step 522 is a "YES" determination, the call is released in step 524. If the outcome of decision step 522 is a "NO" determination, the process return to step 504 in which the reconnection time-out sequence is reinitiated.

During all of the above-described preferred embodiments, it is assumed that the other party involved in the call (that is, the party other than the user of wireless terminals 135 or 155) maintains the connection while reconnection attempts occur. Preferably, an announcement message informing the party to hold the connection while reconnect is attempted is issued.

Advantageously, the preferred embodiments of the present invention allows a mobile terminal, base station and a mobile switching center in a wireless telecommunications system to hold call resources while reconnection attempts are made resulting in a more efficient use of network for reconnection. Further, the preferred embodiments of the present invention allow the mobile switching center and the base station to make a determination as to whether reconnection attempts will occur. For example, if it is determined that there is heavy call volume, either the base station or the mobile switching center may elect to forego reconnection attempts. In this manner, the wireless telecommunications service providers are afforded with flexibility regarding reconnection attempts.

Although this invention has been described with respect to preferred embodiments, those skilled in the art may devise numerous other arrangements without departing from the scope of the invention defined in the following claims.

The invention claimed is:

1. A method for reestablishing a call connection affected by loss of synchronization comprises the steps of:

a mobile terminal receiving a reconnection message from a base station upon loss of synchronization of the call connection, the base station holding all call resources associated with the call connection during issuance of the reconnection message; and the mobile terminal reestablishing the call connection through interaction with the base station using a reconnection protocol.

2. The method of claim 1 further comprising the step of:

the mobile terminal sending a request for new air traffic channels to the base station over a reconnection channel.

3. The method of claim 1 further comprising the step of:

the mobile terminal detecting loss of synchronization by being unable to detect a carrier frequency associated with a call.

4. The method of claim 3 wherein the step of detecting loss of synchronization comprises the step of:

the mobile terminal not receiving data during an anticipated time slot.

5. The method of claim 1 wherein the step of the mobile terminal reestablishing the call connection through interaction with the base station using a reconnection protocol comprises the mobile terminal tuning to an air traffic channel.

6. The method of claim 1 wherein the step of a mobile terminal receiving a reconnection message from a base station comprises the mobile terminal receiving a broadcast reconnection message from the base station.

7. A mobile terminal comprising means for transmitting signals to a base station; and a reconnection processor for responding to a reconnection message received from the base station, wherein the base station holds all call resources associated with a disconnected call during issuance of the reconnection message.

8. The mobile terminal of claim 7 further comprising means for detecting disconnection during an established call.

9. The mobile terminal of claim 7, wherein the mobile terminal reconnection processor tunes to a reconnection channel established by the base station.

10. The mobile terminal of claim 7 further comprising means for releasing resources associated with the call connection.

* * * * *